United States Patent
Kuo et al.

(10) Patent No.: US 9,074,937 B2
(45) Date of Patent: Jul. 7, 2015

(54) MULTIPLE CONCURRENT SPECTRAL ANALYSES

(71) Applicant: Hewlett-Packard Development Company, L.P., Houston, TX (US)

(72) Inventors: Huei Pei Kuo, Cupertino, CA (US); Zhiyong Li, Foster City, CA (US); Shih-Yuan Wang, Palo Alto, CA (US); Steven J. Barcelo, Palo Alto, CA (US); Ansoon Kim, Mountain View, CA (US); Gary Gibson, Palo Alto, CA (US); Alexandre M Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 88 days.

(21) Appl. No.: 13/754,283

(22) Filed: Jan. 30, 2013

(65) Prior Publication Data

US 2014/0211199 A1    Jul. 31, 2014

(51) Int. Cl.
G01N 21/00 (2006.01)
G01J 3/44 (2006.01)
G01J 3/02 (2006.01)
G01J 3/28 (2006.01)

(52) U.S. Cl.
CPC .............. *G01J 3/44* (2013.01); *G01J 3/0294* (2013.01); *G01J 3/2803* (2013.01); *G01J 3/4406* (2013.01); *G01J 3/0208* (2013.01)

(58) Field of Classification Search
CPC .............. G01J 3/02; G01J 3/513; G01J 3/51; G01N 15/1459; G01N 21/65
USPC ......................................... 356/73
See application file for complete search history.

(56) References Cited

U.S. PATENT DOCUMENTS

| 4,505,586 | A   | 3/1985 | Tochigi et al. |
| 6,264,331 | B1* | 7/2001 | Sawai et al. .................. 353/31 |
| 7,079,240 | B2  | 7/2006 | Scherer et al. |
| 7,564,547 | B2  | 7/2009 | Yoo |
| 7,880,882 | B2  | 2/2011 | Jayaraman et al. |
| 7,952,719 | B2  | 5/2011 | Brennan, III |

(Continued)

FOREIGN PATENT DOCUMENTS

WO    WO-9808066    2/1998

OTHER PUBLICATIONS

Adany, P. et al., Tunable Excitation Source for Coherent Raman Spectroscopy Based on a Single Fiber Laser, Applied Physics Letters, Nov. 1, 2011, vol. 99, pp. 181112-1-181112-3.

(Continued)

*Primary Examiner* — Tarifur Chowdhury
*Assistant Examiner* — MD Rahman
(74) *Attorney, Agent, or Firm* — Mannava & Kang, P.C.

(57) ABSTRACT

According to an example, apparatuses for performing multiple concurrent spectral analyzes on a sample under test include an optical system to concurrently direct a plurality of light beams onto analytes at multiple locations on the sample under test, in which the plurality of light beams cause light in either or both of a Raman spectra and a non-Raman spectra to be emitted from the analytes at the multiple locations of the sample under test. The apparatuses also include a detector to concurrently acquire a plurality of spectral measurements of the light emitted from the analytes at the multiple locations of the sample under test. Example methods of performing spectral analysis include use of the apparatuses.

14 Claims, 8 Drawing Sheets

(56) References Cited

U.S. PATENT DOCUMENTS

| | | |
|---|---|---|
| 2004/0125372 A1* | 7/2004 | Walla et al. .................. 356/318 |
| 2005/0171436 A1 | 8/2005 | Clarke et al. |
| 2006/0061761 A1 | 3/2006 | Li et al. |
| 2006/0119843 A1* | 6/2006 | O'Connell .................. 356/246 |
| 2006/0197947 A1 | 9/2006 | Wang et al. |
| 2008/0220512 A1 | 9/2008 | Koh et al. |
| 2008/0310470 A1 | 12/2008 | Ooi et al. |
| 2011/0085164 A1 | 4/2011 | Nelson et al. |
| 2012/0035442 A1 | 2/2012 | Barman et al. |
| 2012/0065490 A1 | 3/2012 | Zharov et al. |
| 2012/0127468 A1* | 5/2012 | Bloch et al. .................. 356/391 |

OTHER PUBLICATIONS

International Search Report and Written Opinion, Apr. 29, 2013. PCT Application No. PCT/US2012/062739.

Raman Scattering and Fluorescence, (Research Paper), Horiba Jobin Yvon, Inc., Aug. 15, 2005.

* cited by examiner

MULTIPLE CONCURRENT SPECTRAL ANALYSES

CROSS REFERENCE TO RELATED APPLICATION

This application discloses subject matter that is similar to subject matter disclosed in co-pending PCT Application Serial No. PCT/US2012/062739, entitled "Multiple Spectral Measurement Acquisition Apparatus and the Methods of Using Same," filed on Oct. 31, 2012, the disclosure of which is hereby incorporated by reference in its entirety.

BACKGROUND

Spectroscopy, which broadly refers to the interaction between energy and matter, may be used for such purposes as chemical and biological sensing. In a typical spectroscopy measurement, incident radiation (photons, for example) is directed to a particular analyte (i.e., a species, molecule, compound, biological or non-biological specimens, or, in general, matter being analyzed). The molecules in the analyte can inelastically scatter (Raman scatter) the incident radiation or the molecules can emit photons (luminescence) as a result of absorbing the incident photons.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1A:
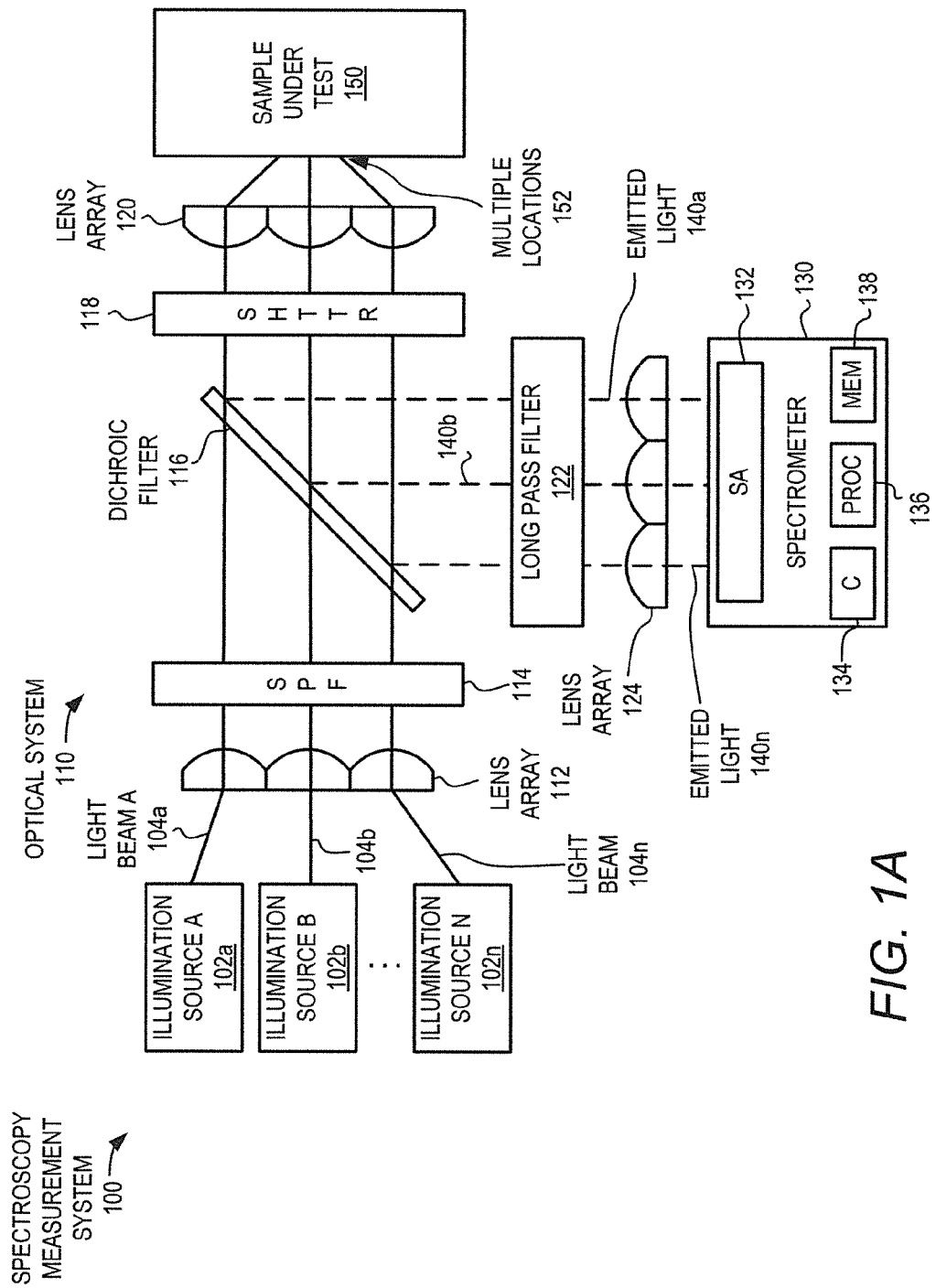
FIG. 1A shows a block diagram of a spectroscopy measurement system, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on. In addition, the term "light" refers to electromagnetic radiation with wavelengths in the visible and non-visible portions of the electromagnetic spectrum, including infrared, near infrared, and ultra-violet portions of the electromagnetic spectrum.

Disclosed herein are apparatuses for performing multiple concurrent spectral analyses on a sample under test and methods for performing the multiple concurrent spectral analyses. The apparatuses disclosed herein may include an optical system to concurrently direct a plurality of light beams onto analytes at multiple locations on the sample under test. The analytes, which may include species, molecules, compounds, or biological or non-biological specimen, and in general, matter being analyzed, at the multiple locations may thus be illuminated by the light beams, which may cause light in either or both of a Raman spectra and a non-Raman spectra to be scattered and/or emitted from those analytes. The apparatus may also include a detector to concurrently acquire a plurality of spectral measurements of the light emitted from the analytes at the multiple locations of the sample under test.

The spectral energy, i.e., the spectrum, emitted by a given analyte when subjected to incident electromagnetic or optical radiation depends on the composition of the analyte. In this manner, a spectroscopy measurement may contain one or more types of spectra intertwined together. For example, the spectra may include Raman photons, which are inelastically scattered, i.e., their wavelengths are shifted (up or down) by specific wavelengths relative to the wavelength of the incident photons. These shifts and the intensity distribution of the scattered photons may also form a characteristic signature, or "fingerprint," of the analyte, otherwise known as the Raman spectrum. The spectra may also include luminescence photons, which occur when incident photons are absorbed and reemitted with shifted (up or down) wavelengths. With luminescence, the wavelengths of the reemitted photons and the intensity distribution, rather than the wavelength shifts relative to the wavelength of the excitation illumination, form another characteristic signature of the analyte, the luminescence spectrum. Fluorescence is a special case of photoluminescence.

In many cases, the co-existence of the Raman spectrum and the luminescence spectrum may undermine the quality of the Raman spectrum for quantitative analysis of the analyte under test. According to an example, the apparatuses and methods disclosed herein may allow the reliable and convenient separation of Raman spectrum from non-Raman spectrum. More specifically, the apparatuses and methods disclosed herein may enable the acquisition of multiple spectral measurements of the light emitted from the analyte under test (also called the "sample under test" herein). The measurements may also be processed to distinguish between Raman photons and photons emitted from other competing photon sources, such as luminescence spectra, for example. More specifically, the apparatuses and methods disclosed herein may enable the concurrent differentiation, separation, and reconstruction/recovery of the Raman spectra and the non-Raman spectra at multiple locations of the sample under test.

For example, if a given sample under test generates both Raman and fluorescence spectra, the apparatuses and methods disclosed herein may be used to conduct spectroscopy measurements and process the measurements in a manner to derive separate representations of the Raman and fluorescence spectra conveniently and reliably. In addition, the separate representations of the Raman and fluorescence spectra may concurrently be derived for multiple locations or multiple analytes of the sample under test. The identities of multiple analytes in a sample under test may be determined based on the identified spectra. The apparatuses and methods described herein may enable the implementation of a compact system for sensor application. Moreover, the concurrent acquisition of the plurality of spectral measurements of the light scattered and/or emitted from the analytes at multiple locations of the sample under test may generally enable expeditious analysis and differentiation of the physical mechanisms and processes (such as Raman scattering, photoluminescence, phosphorescence, etc.) of the energy loss and to expedite identified of the sample under test, which may contain multiple types of analytes positioned at multiple locations of the sample under test.

It is thus noted that a particular compound that is in a given spectroscopy measurement may contain one or multiple molecules that are detectable using Raman, wavelength-shifted radiation from these molecules, whereas other molecules of the compound may produce fluorescence and another luminescence emission simultaneously.

With reference first to FIG. 1A, there is shown a block diagram of a spectroscopy measurement system 100, according to an example. It should be understood that the spectroscopy measurement system 100 depicted in FIG. 1 may include additional components and that some of the components described herein may be removed and/or modified without departing from a scope of the spectroscopy measurement system 100 disclosed herein. It should also be understood that the components depicted in FIG. 1 are not drawn to scale and thus, the components may have different relative sizes with respect to each than as shown therein.

As shown, the spectroscopy measurement system 100 may include multiple illumination sources 102a-102n, an optical system 110, and a spectrometer 130 that are to respectively illuminate, optically guide, and detect spectra measurements of light emitted from analytes at multiple locations 152 of a sample under test (SUT) 150. The SUT 150 may be in proximity to or contain a surface to enhance and promote Raman scattering and/or other types of illumination. Thus, for instance, the SUT 150 may be provided on a substrate that has been functionalized to enhance and promote Raman scattering and/or emission of other types of illumination. In addition, or alternatively, the multiple locations 152 of the SUT 150 may contain or be positioned on different portions of a substrate that contain functionalized surfaces to enhance and promote different types of illumination from the SUT 150. In this example, one of the locations 152 may be functionalized to enhance Raman scattering and another one of the locations may be functionalized to enhance non-Raman emissions, e.g., fluorescence, luminescence, etc. Thus, light acquired from an analyte positioned near one of the locations 152 may likely include Raman spectra and light acquired from an analyte positioned near another one of the locations 152 may likely include non-Raman spectra.

In other examples, the multiple locations 152 of the SUT 150 may contained or be positioned on different portions of a substrate that contain functionalized surfaces to enhance Raman scattering and/or non-Raman emission of particular types of respective analytes. Thus, for instance, one location of the multiple locations 152 may be functionalized to enhance Raman scattering of a first analyte and another location of the multiple locations 152 may be functionalized to enhance Raman scattering and/or non-Raman emission of another analyte, in which the analytes may be different types of analytes with respect to each other.

Generally speaking, the spectroscopy measurement system 100 may enable the simultaneous or concurrent emission of light beams 104a-104n onto analytes at multiple locations 152 of the SUT 150. In addition, the spectroscopy measurement system 100 may also enable the simultaneous or concurrent detection of light 140a-140n, e.g., Raman scattered, fluorescence, luminescence, etc., scattered and/or emitted from analytes at the multiple locations 152 of the SUT 150. In one regard, therefore, the amount of time required to perform spectral analysis on the SUT 150 may substantially be reduced as compared with traditional spectral analysis techniques that detect light emitted from a single location of a sample at a time.

As shown, multiple light beams 104a-104n, which may include radiation in the form of incident photons (e.g., laser beams), may be emitted from the multiple illumination sources 102a-102n, in which "n" represents an integer greater than one. The multiple light beams 104a-104n may also be directed onto the multiple locations 152 of the SUT 150 through the optical system 110. The multiple illumination sources 102a-102n may be arranged in a relatively compact array, for instance, in which the illumination sources 102a-102n may be separated by distances of around 250 microns with respect to each other. According to an example, the multiple illumination sources 102a-102n may emit a respective light beam 104a-104n that has a different wavelength with respect to the other light beams 104a-104n. By way of particular example, one of the light beams 104a may be in the ultraviolet (UV) wavelength, another one of the light beams 104b may be in a visible wavelength, and a further one of the light beams 104c may be in the infrared (IR) wavelength. As another particular example, each of the light beams 104a-104n may have different wavelengths with respect to each other, in which the different wavelengths are in the same range of wavelengths. Alternatively, however the multiple illumination sources 102a-102n may emit the light beams 104a-104n at the same wavelengths with respect to each other. In any of the examples above, the wavelengths at which the light beams 104a-104n are emitted by the multiple illumination sources 102a-102n may be varied.

The optical system 110 may include a lens array 112, a wavelength filter (SPF) 114, a dichroic filter 116, a shutter (SHTTR) 118, a second lens array 120, a long pass filter 122, and a third lens array 124. The lens arrays 112, 120, and 124 may include any suitable optical components that are to, for instance, at least one of individually collimate and focus the light beams 104a-104n. According to an example, the lens arrays 112, 120, and 124 may be microlens arrays.

According to an example, the illumination sources 102a-102n may emit the light beams 104a-104n in a one dimensional array. In another example, the illumination sources 102a-102n may emit the light beams 104a-104n in a two dimensional array. In the latter example, the lens arrays 112, 120, and 124 may also include two dimensional arrays of lenses, e.g., microlens arrays having microlenses arranged in two dimensional arrays.

The light beams 104a-104n may be directed into the lens array 112 and pass through the wavelength filter 114. More particularly, the light beams 104a-104n emitted from the illumination source(s) 102a-102n may have relatively short wavelengths and the wavelength filter 114 may allow the passage of at least a selected band of the emission from the illumination sources 102a-102n and block out spurious wavelengths outside of the selected bands. The light beams 104a-104n that are allowed to pass through the wavelength filter 114 may further be directed along an optical path that passes through the dichroic filter 116, which, in turn, may direct part of the incident light through an optical path that extends through the shutter 118 (when open), the second lens array 120, and onto analytes at the multiple locations 152 of the SUT 150.

The incident light emitted onto the multiple locations 152 of the SUT 150 may cause the analytes (e.g., analyte molecules) contained in those locations 152 to emit light 140a-140n that may exhibit fluorescence, other types of luminescence, and/or Raman scattering, depending on the composition of the analytes. According to an example, the multiple locations 152 or the portions of a substrate to which the multiple locations 152 correspond may be functionalized for enhanced Raman scattering or for an enhanced non-Raman signal emission, such as fluorescence, other types of luminescence, or other wavelength dependent spectroscopies. That is, for instance, the surface of a substrate (not shown) on which the SUT 150 is provided may be functionalized for enhanced Raman scattering or for an enhanced non-Raman signal emission. The multiple locations 152 may also correspond to regions engineered for excitation via particular polarizations or to create scattered or emitted signals with a particular polarization. In addition or alternatively, the surface of the substrate may be functionalized for particular analytes. According to an example, one of the multiple locations 152 of the SUT 150 is functionalized for enhanced Raman scattering and another one of the multiple locations 152 of the SUT 150 is functionalized for enhanced non-Raman signal emission. In this regard, some analytes of the SUT 150 may be illuminated for enhanced Raman scattering while other analytes of the SUT 150 may simultaneously be illuminated for enhanced non-Raman emissions.

According to an example, the SUT 150 and/or various locations on the substrate supporting the SUT 150 may be functionalized to improve the Raman scattering process, which is called surface enhanced Raman spectroscopy (SERS). As an example, the Raman-scattering enhancing surface in SERS may be formed from one or more of rough metal surfaces; metal nanoparticles; various types of nanoantennas; nanostructures, such as nanofingers, nanowires coated with metal; black silicon coated with metal; as well as waveguiding structures. In other examples, the SUT 150 may or may not be disposed near a SERS-based surface. According to another example, the SUT 150 and/or various locations on the substrate supporting the SUT 154 may be functionalized to improve luminescence (or fluorescence). As an example, the SUT 150 and/or the various locations on the substrate may be provided with luminescent and/or fluorescent probe particles.

Figure 1B:
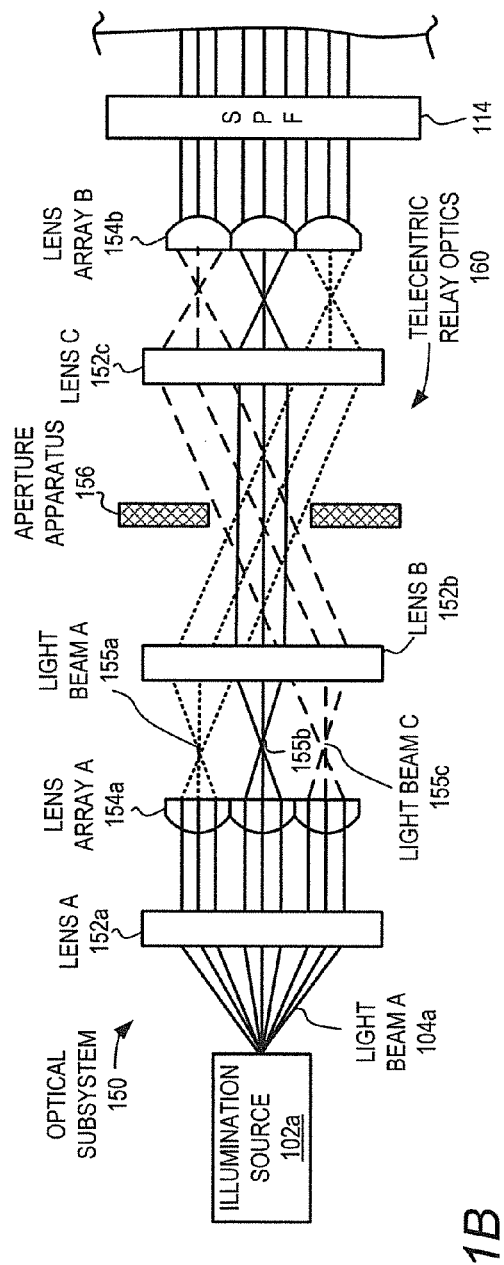
FIGS. 1B-1D, respectively show diagrams of optical subsystems that may be implemented with the optical system depicted in FIG. 1A, according to examples of the present disclosure.

According to an example, instead of the multiple illumination sources 102a-102n depicted in FIG. 1A, the multiple light beams 104a-104n directed onto the analytes at the multiple locations 152 of the SUT 150 may be generated from a single illumination source 102a, as shown in FIG. 1B. Particularly, FIG. 1B shows a diagram of an optical subsystem 150 that may be implemented with the optical system 110 depicted in FIG. 1A. That is, the optical subsystem 150 may be used in the optical system 110 when a single illumination source 102a is used to generate the multiple light beams 104a-104n. In one regard, the optical subsystem 150 may replace the lens array 112 depicted in FIG. 1A.

As shown in FIG. 1B, in the optical subsystem 150, the illumination source 102a may emit a light beam 104a onto a first lens 152a. The first lens 152a may collimate the light beam 104a onto a first lens array 154a, which may be a microlens array. The first lens array 154a may separate the light beam 104a into a plurality of light beams 155a-155c that are focused onto physically separated locations on or in close proximity to the front focal plane of a second lens 152b. The light beams 155a-155c are respectively depicted as being represented by dotted, solid, and dashed lines to distinguish each of the light beams 155a-155c from each other. It should be understood that the light beams 155a-155c may maintain the same color/wavelength of the original light beam 104a.

The second lens 152b may collimate each of the light beams 155a-155c into separate beams that pass through an aperture apparatus 156 and onto a third lens 152c. The third lens 152c may direct each of the light beams 155a-155c onto respective lenses on a second lens array 154b, which may also be a microlens array. The second lens array 154b may direct each of the light beams 155a-155c as physically separated light beams onto the wavelength filter 114. The light beams 155a-155c may pass through the remaining components of the optical system 110 as physically separated light beams as discussed above with respect to FIG. 1A.

The second lens 152b, the aperture apparatus 156, and the third lens 152c may form a 1× telecentric relay optics 160 that may allow the use of a single physical aperture apparatus 156 to limit the emission angles of all of the light beams 155a-155c. In addition, the 1× telecentric relay optics 160 may provide distortion-free imaging with relatively good optical quality. Moreover, the 1× telecentric relay optics 160 may enable all of the light beams 155a-155c to have the same emission angle. Furthermore, because a single physical aperture apparatus 156 may be used, the 1× telecentric relay optics 160 may be relatively simple to fabricate, locate, and align for a relatively robust and stable optical performance.

Figure 1C:
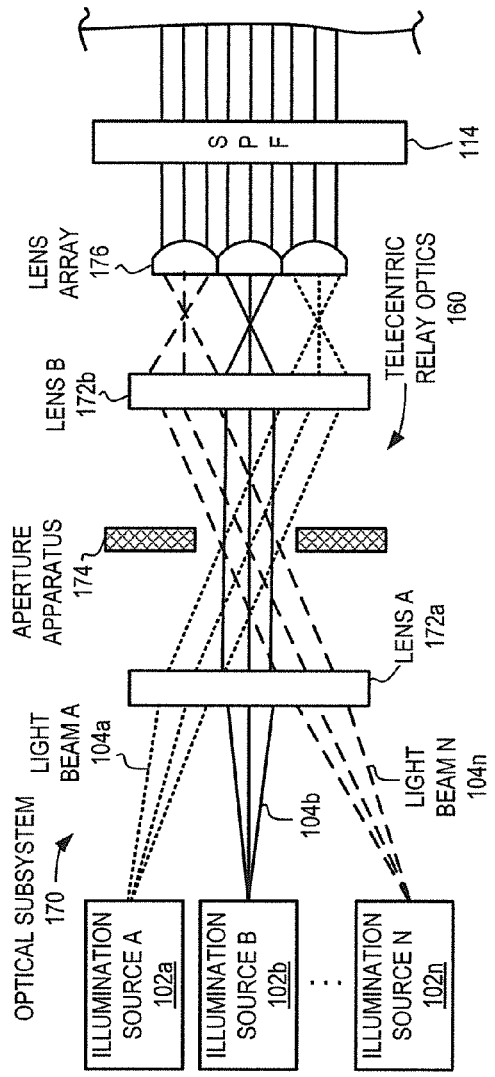

A telecentric relay optics 160 may also be implemented with a plurality of illumination sources 102a-102n, for instance, as shown in FIG. 10. Particularly, FIG. 1C shows a diagram of an optical subsystem 170 that may be implemented with the optical system 110 depicted in FIG. 1A. That is, the optical subsystem 170 may be used in the optical system 110 when multiple illumination sources 102a-102n are used to generate the multiple light beams 104a-104n. In one regard, the optical subsystem 170 may replace the lens array 112 depicted in FIG. 1A. The telecentric relay optics 160 in the optical subsystem 170 may include a first lens 172a, an aperture apparatus 174, and a second lens 172b.

As shown in FIG. 1C, in the optical subsystem 170, the illumination sources 102a-102n may emit respective light beams 104a-104n onto the first lens 172a of the telecentric relay optics 160. The light beams 104a-104n are respectively depicted as being represented by dotted, solid, and dashed lines to distinguish each of the light beams 104a-104n from each other. According to an example, the light beams 104a-104n may have different wavelengths with respect to each other. In other examples, some or all of the light beams 104a-104n may have the same wavelengths with respect to each other.

The first lens 172a may collimate each of the light beams 104a-104n into separate beams that pass through the aperture apparatus 174 and onto the second lens 172b. The second lens 172b may direct each of the light beams 104a-104n onto respective lenses on a lens array 176, which may be a microlens array. The lens array 176 may direct each of the light beams 104a-104n as physically separated light beams onto the wavelength filter 114. The light beams 104a-104n may pass through the remaining components of the optical system 110 as physically separated light beams 104a-104n as discussed above with respect to FIG. 1A.

The 1× telecentric relay optics 160 may allow the use of a single physical aperture apparatus 156 to limit the emission angles of all of the light beams 104a-104n. In addition, the 1× telecentric relay optics 160 may provide distortion-free imaging with relatively good optical quality. Moreover, the 1× telecentric relay optics 160 may enable all of the light beams 104a-104n to have the same emission angle.

Figure 1D:
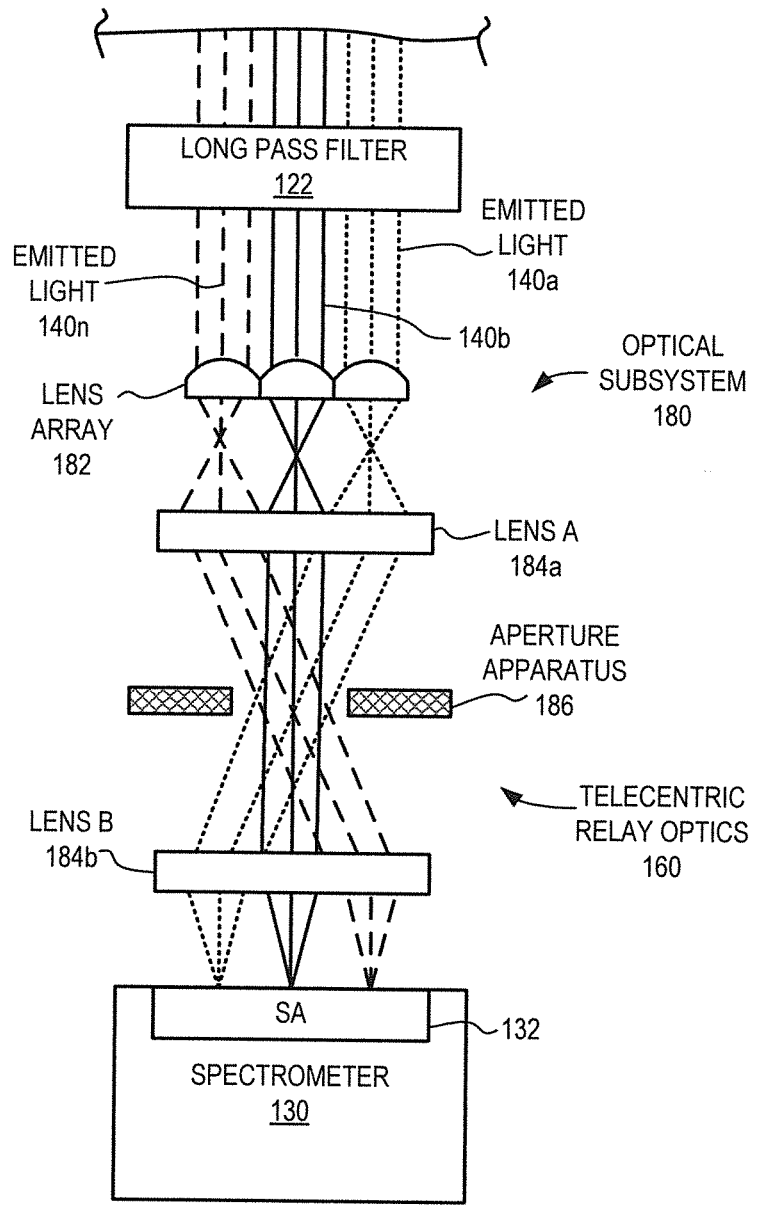

A telecentric relay optics 160 may also be implemented to allow the use of a single physical aperture apparatus to limit the emission angles of the light 140a-140n emitted from the analytes at the multiple locations 152 of the SUT 150 onto the spectrometer 130, as shown in FIG. 1D. Particularly, FIG. 1D shows a diagram of an optical subsystem 180 that may be implemented with the optical system 110 depicted in FIG. 1A and/or either of the optical subsystems 150, 170 depicted in FIGS. 1B and 1C. That is, the optical subsystem 180 may be used in place of the third lens array 124 depicted in FIG. 1A. The telecentric relay optics 160 in FIG. 1D may include a first lens 184a, an aperture apparatus 186, and a second lens 184b.

As shown in FIG. 1D, light 140a-140n emitted from analytes at the multiple locations 152 of the SUT 150 may pass through the long pass filter 122 and onto a lens array 182, which may be a microlens array. The lens array 182 may focus the separate emitted light 140a-140n onto physically separate locations in a proximity of the front focal plane of the first lens 184a of the telecentric relay optics 160. The emitted light 140a-140n is respectively depicted as being represented by dotted, solid, and dashed lines to distinguish each of the emitted light 140a-140n from each other. It should be understood that the emitted light 140a-140n may have the same color/wavelengths with respect to each other or that the emitted light 140a-140n may have different colors/wavelengths with respect to each other, for instance, depending upon whether the emitted light 140a-140n resulted from multiple light beams 104a-104n having the same wavelength or from multiple light beams 104a-104n having different wavelengths with respect to each other.

The first lens 184a may collimate each of the emitted light 140a-140n into separate beams that pass through the aperture apparatus 186 and onto the second lens 184b. The second lens 184b may direct each of the emitted light 140a-140n onto respective locations of a sensor array 132 on the spectrometer 130.

The 1× telecentric relay optics 160 in the optical subsystem 180 may allow the use of a single physical aperture apparatus 156 to limit the emission angles of all of the emitted light 140a-140n. In general, the scattered light from the multiple locations 152 may be isotropic or emitted with a large cone angle and thus, a signal from one location of the SUT 150 may enter neighboring lenses of the lens array 182 and may create undesirable background or noise. The placement of the telecentric relay optics 160 disclosed herein may substantially minimize and/or eliminate the undesirable background or noise through use of the single aperture apparatus 186.

Figure 2:
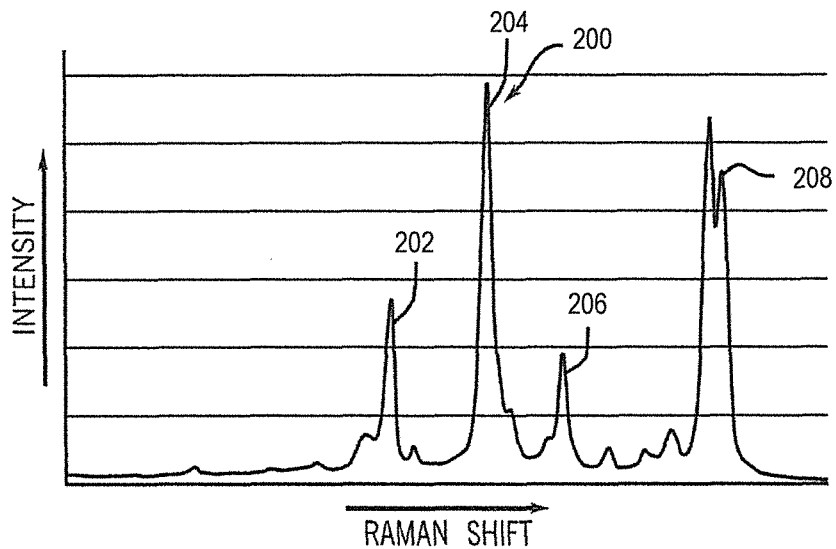
FIG. 2 is an illustration of a Raman spectrum emitted by a sample under test, according to an example of the present disclosure.
Figure 5:
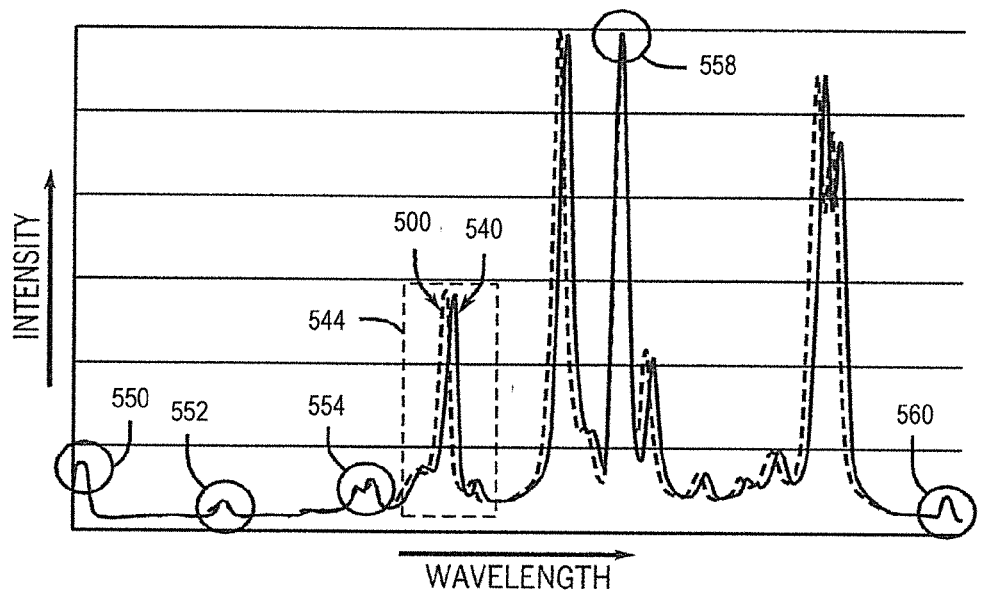
FIG. 5 depicts illustrations of composite spectra acquired in spectroscopy measurements of a sample under test performed using the spectroscopy measurement system of FIG. 1 and using different excitation source wavelengths, according to an example of the present disclosure.

Turning now to FIG. 2, there is shown an example Raman spectrum 200 when illuminated with an incident radiation of wavelength $\lambda_i$. For Raman scattering, the interaction of the incident photons and the SUT 150 may cause a relatively small fraction of the incident photons (approximately 1 in 10 million) to be scattered by atoms or molecules of the analyte, with the scattered photons having a frequency different from, and usually lower than, that of the incident photons. The intensity and the shift in frequency of the scattered photons are unique to the analyte and produce a characteristic "fingerprint" when the scattered photons are analyzed. The intensity and the wavelength distribution, i.e., the Raman spectra, of the inelastically scattered photons are the unique characteristics or the fingerprints of the analyte. The intensity of Raman scattered photons at wavelength $\lambda$ may be plotted as a function of the wave number of the Raman shift, $(1/\lambda_i - 1/\lambda)$. In this representation, the peak distribution of the Raman spectrum remains relatively unchanged when the wavelength of the incident radiation, $\lambda_i$, is changed from $\lambda 1$ to $\lambda 2$. The locations of the analyte specific peaks, such as 202, 204, 206, and 208, have the same energy gain or loss independent of the energy (i.e. frequency/wavelength) of the incident photons. Raman spectra plotted in the conventional fashion, i.e., the intensity of the Raman scattered photons vs. Raman shift in wavenumbers, thus, remain unchanged. As an alternative representation, the Raman spectrum is plotted against the wavelength. In this representation, the spectrum, however, may be shifted, as depicted in FIG. 5 and described in further detail herein below.

The SUT 150 may also produce spectra through, for example, fluorescence, where the incident photons or other electromagnetic radiation is absorbed by the analyte and reemitted. In most cases, the emitted light has a longer wavelength, and therefore lower energy, than the absorbed radiation. However, when the absorbed electromagnetic radiation is highly coherent in a relatively short period, it is possible for one electron to absorb two photons; and this two photon absorption may lead to emission of radiation having a shorter wavelength than the absorbed radiation. The incident photon energy can be exactly same as the electron transition energy of a molecule, which may be termed "resonance fluorescence."

The intensity and the wavelengths of the luminescent photons, i.e., the luminescent spectra, form a characteristic signature of the analyte. Unlike the Raman spectra, the locations of the analyte specific luminescent peaks remain unchanged when the luminescent spectrum is plotted against the wavelength. Conversely, the locations of the luminescent peaks shift when plotted against the wave numbers $(1/\lambda_i - 1/\lambda)$.

Regardless of the composition of the light 140a-140n that results from the interaction of the incident radiation and the analyte, the resulting light 140a-140n is directed along an optical path that may pass back through the second lens array 120, the shutter 118, and to the dichroic filter 116. In other examples, the dichroic filter 116 may be replaced by a beam splitter.

Due to the relatively long wavelength of the scattered or emitted light 140a-140n and the wavelength selectivity of the dichroic filter 116, the dichroic filter 116 may direct the light 140a-140n along an optical path that may pass through the long pass filter 122 and, the third lens array 124 to an imaging, or sensing, array (SA) 132 (a CMOS/CCD sensor array, for example) of the spectrometer 130. The sensor array 132, or detector array, may simultaneously or concurrently capture multiple images (i.e., acquire spectral and or imagery data) of the emitted light 140a-140n and an analyzer may process the corresponding image data to separate and reconstruct the Raman, fluorescence, and/or additional luminescence spectra. It is noted that various features of the spectroscopy measurement system 100 are omitted from FIG. 1 for purposes of clarity. For example, the spectrometer 130 may have additional components that are not shown in FIG. 1, such as gratings, lenses, mirrors, beam splitters, mechanical motion components, etc.

Due to the above-described configuration of the spectroscopy measurement system 100, given spectroscopy measurements acquired by the spectrometer 130 may be a composite measurement, which contain one or more of fluorescence, luminescence, (incandescent,) reference and Raman spectra. In addition, the spectroscopy measurements acquired by the spectrometer 130 may be composite measurements of analytes at multiple locations 152 of the SUT 150.

Referring to FIG. 2 in conjunction with FIG. 1, as an example, the SUT 150 may contain at least one molecule that produces a Raman spectrum 200. The particular example Raman spectrum 200 depicted in FIG. 2 is the trans-1,2-bis (4-pyridyl)ethylene (BPE) molecule. The Raman spectrum 200 depicted in FIG. 2 includes various spectral peaks, such as example spectral peaks 202, 204, and 206, whose respective wavelengths depend on the wavelength of the incident photon wavelength. It is noted that FIG. 2 does not depict the composite measurement acquired by the sensing array 132 for the example described herein, however.

Figure 3:
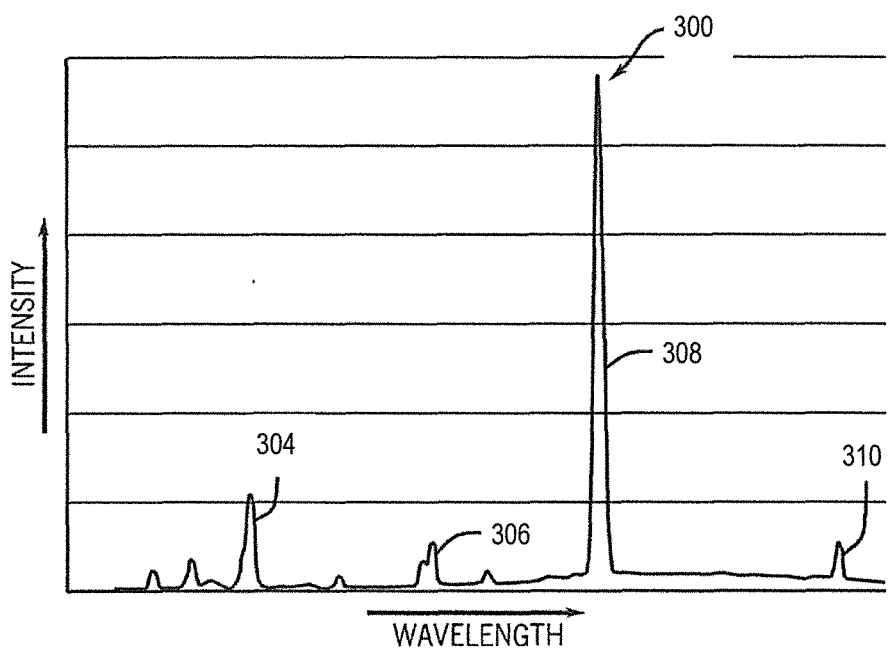
FIG. 3 is an illustration of a fluorescence spectrum, according to an example of the present disclosure.

In this manner, FIG. 3. depicts an example fluorescence spectrum 300, which may be produced by a given reference material on or in the proximity of the SUT 150. The fluorescence spectrum 300 includes various spectral peaks 304, 306, 308, and 310, as shown in FIG. 3. These peaks 304, 306, 308, and 310 are disposed at wavelengths which, unlike Raman spectra, do not change with the wavelength of the incident photons. As a specific example, the spectrum shown in FIG. 3 is a simplified, composite representation of the fluorescent spectrum of a red lamp phosphor and a mercury arc (peak 308).

Figure 4:
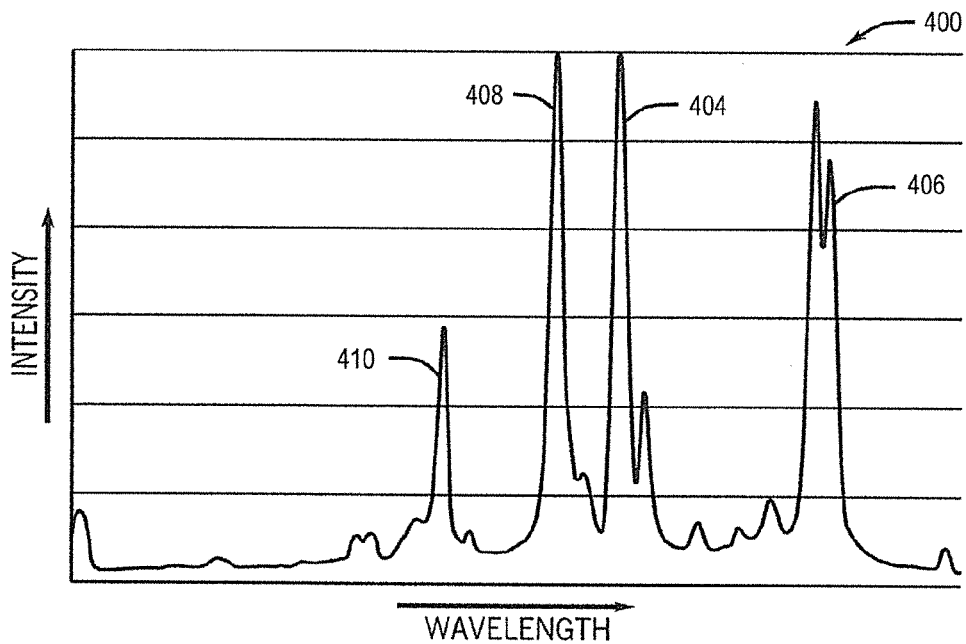
FIG. 4 is an illustration of a composite spectrum acquired by the spectroscopy measurement system of FIG. 1, according to an example of the present disclosure.

Referring to FIG. 4, the sensing array 132 may sense a composite spectrum 400 for a particular location 152, which is a combination of the Raman spectrum 200 (FIG. 2) and the fluorescence spectrum 300 (FIG. 3). According to an example, the intensity distribution vs. wavelength of the reference peaks may be measured and calibrated beforehand and may be separated from the other fluorescent peaks. The composite spectrum 400 may further include fluorescence and/or luminescence background spectral energy attributable to the ambient environment of the spectroscopy measurement system 100. In various examples, these types may be characterized beforehand and separated from the fluorescent spectral component of the SUT 150 and may be thus separated and reconstructed.

As disclosed herein, for purposes of discriminating between the above-different spectra, the spectroscopy measurement system 100 may acquire multiple composite specific measurements at various optical conditions in connection with these measurements, which may allow the system 100 to discriminate the different spectra. According to an example, one or multiple inherent and/or controlled characteristics of the illumination source(s) 102a-102n may vary among the measurements. For instance, the illumination source(s) 102a-102n may vary the wavelength of the incident radiation emitted onto the multiple locations 152 of the SUT 150 so that the composite spectral measurements acquired by the spectrometer 130 over a period of time are associated with different excitation wavelengths. As further disclosed herein, the different excitation wavelengths impart characteristics to the acquired measurements, which may allow the Raman spectra to be discriminated from the fluorescence and/or luminescence spectra of the analytes at the multiple locations 152.

As another example, multiple illumination sources 102a-102n that emit light at different wavelengths with respect to each other may be implemented such that different locations 152 on the SUT 150 may concurrently be illuminated with light at multiple different wavelengths. In this example, the spectrometer 130 may concurrently obtain multiple spectral measurements, in which the multiple spectral measurements are associated with different excitation wavelengths. The multiple spectral measurements associated with the different excitation wavelengths may be used to discriminate from the fluorescence and/or luminescence spectra of the analytes at the multiple locations 152.

According to an example, the different excitation wavelengths may introduce corresponding wavelength/wavenumber shifts in the Raman spectra among the composite and/or concurrent measurements that are acquired by the spectrometer 130. However, the wavelengths of any fluorescence and/or luminescence spectra do not shift. Therefore, in accordance with an example, the spectrometer 130 may use this characteristic to separate the spectra. More specifically, FIG. 5 depicts an example in which two source excitation wavelengths were used at different times to produce two composite measurements of spectra 500 and 540, as captured by the sensing array 132 of the spectrometer 130. Similar composite measurements of spectra may be made for analytes at multiple locations 152 of the SUT 150.

In general, the Raman spectra-related portions of the spectra 500 and 540 are wavelength shifted versions relative to each other. In this manner, the Raman peaks, such as the peaks shown in illustrated portion 544, are separated in wavelength. The Raman spectra for the same species illuminated with different laser wavelengths $\lambda_{1,2}$ will be shifted with respect to each other to wavelengths $\lambda_{R1,2}$ that can be readily found from the relation:

$$\frac{1}{\lambda_{R1}} - \frac{1}{\lambda_{R2}} = \frac{1}{\lambda_1} - \frac{1}{\lambda_2}$$

However, the fluorescence and/or luminescence spectra are not shifted in wavelength, but rather, remain at the same wavelength for the two spectra 500 and 540. This is illustrated in FIG. 5 by the peaks with circles 550, 552, 554, 558 and 560.

Figure 6:
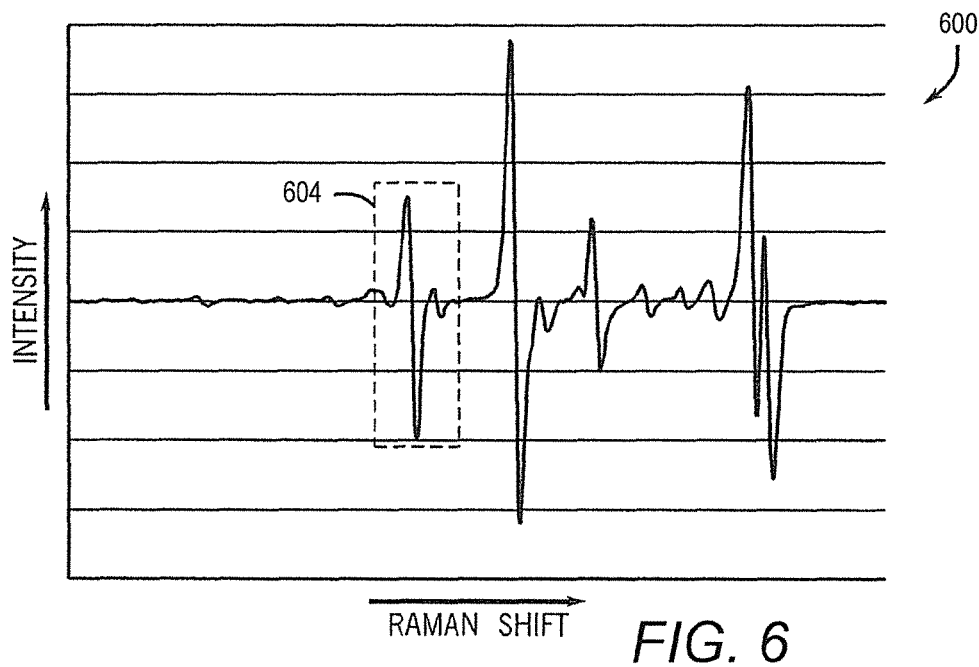
FIG. 6 is an illustration of a differential spectrum, according to an example of the present disclosure.

Techniques that are disclosed herein may be applied to process the composite and/or concurrent measurements based on these characteristics to discriminate the Raman and fluorescence and/or luminescence spectra from each other. For example, in accordance with an example, the spectrometer 130 may process two composite measurements associated with different excitation wavelengths to construct a differential spectrum, such as an example differential spectrum 600 that is depicted in FIG. 6, by subtracting the measurements, spectrum 500 and 540 in FIG. 5, from each other. With this subtraction, the fluorescence and/or luminescence spectra contained in the composite measurements may be "zeroed," as depicted in FIG. 6. However, due to the wavelength shifting, the shifted Raman spectral peaks may produce a nonzero differential spectra, such as the example spectra depicted in illustration portion 604 of FIG. 6. The Raman spectrum of FIG. 2 may be thus reconstructed, e.g., by integrating the differential spectrum 600, (for this example) with the fluorescence and/or luminescence spectra removed.

A representation of the fluorescence and/or luminescence spectra may be derived by subtracting the derived Raman spectra from the composite spectra. In addition, through similar techniques, representations of the fluorescence and/or luminescence spectra may be derived concurrently for a plurality of analytes at multiple locations 152.

Additional reconstruction techniques may be used. For example, the difference spectrum shown in FIG. 6 may be used as an alternative representation of the Raman spectrum shown in FIG. 2.

As yet another example, the SUT 150 may be illuminated with a switchable auxiliary source of excitation in addition to the illumination source 102a. This may cause the intensity of (at least one of) the fluorescent peaks such as the peaks with circles 550, 552, 554, 558, and 560 to vary. The fluorescent peaks may thus be turned on and off if the auxiliary source is switched on and off.

Alternatively, in further examples, a representation of the fluorescence and/or luminescence spectra may be generated without first deriving a representation of the Raman spectra. In this manner, in accordance with an example, one of two composite and/or concurrent measurements may be shifted in wavelength relative to each other to align the corresponding Raman spectra peaks of the measurements and then the wavelength-shifted composite and/or concurrent spectra measurement may be subtracted from the unshifted composite and/or concurrent measurement. Similarly, the one of two composite and/or concurrent measurements may be plotted as functions of Raman shift. In this manner the corresponding Raman spectra peaks of the measurements may be aligned to facilitate the subsequent subtraction and reconstruction operation.

Figure 7A:
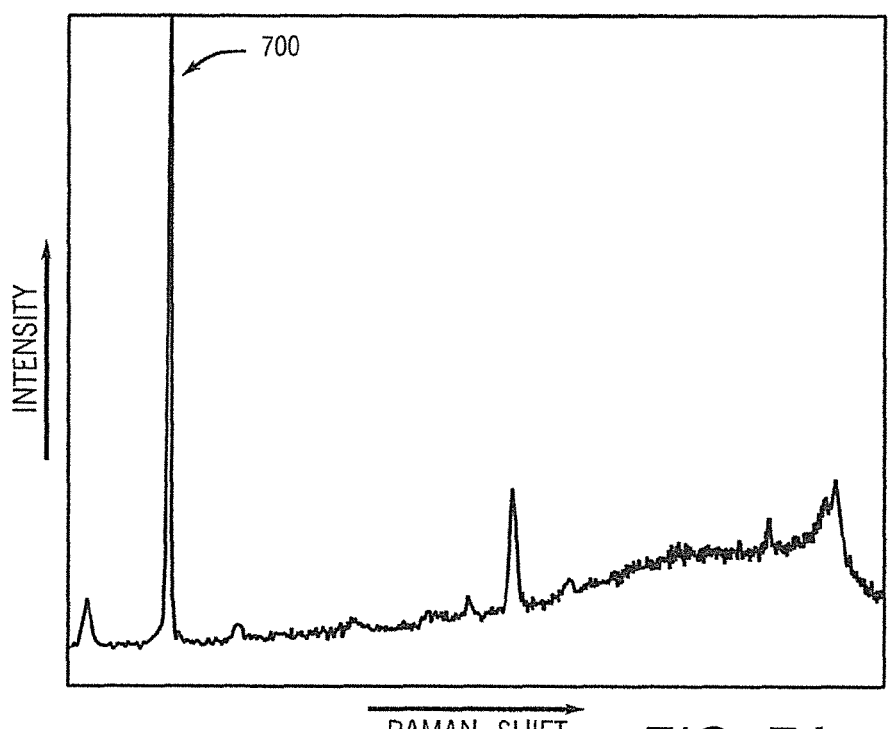
FIG. 7A is an illustration of a Raman-shift wavelength reference spectrum, according to an example of the present disclosure.

The spectrometer 130 may further incorporate at least one reference spectrum element (not shown). This allows the spectrometer to be calibrated accurately based on a prior knowledge of the reference spectra. For example, in accordance with some implementations, a reference spectrum element may introduce a Raman wavelength shifted reference, such as a Raman reference 700 that is depicted in FIG. 7A. As an example, the Raman reference may be produced by silicon nanocones of the reference spectrum element, which introduces a wavenumber shift of ~520 cm$^{-1}$. This knowledge and other a priori knowledge of the components of the spectrometer 130 may be combined to facilitate the calibration of the spectrometer 130, in accordance with an example.

Figure 7B:
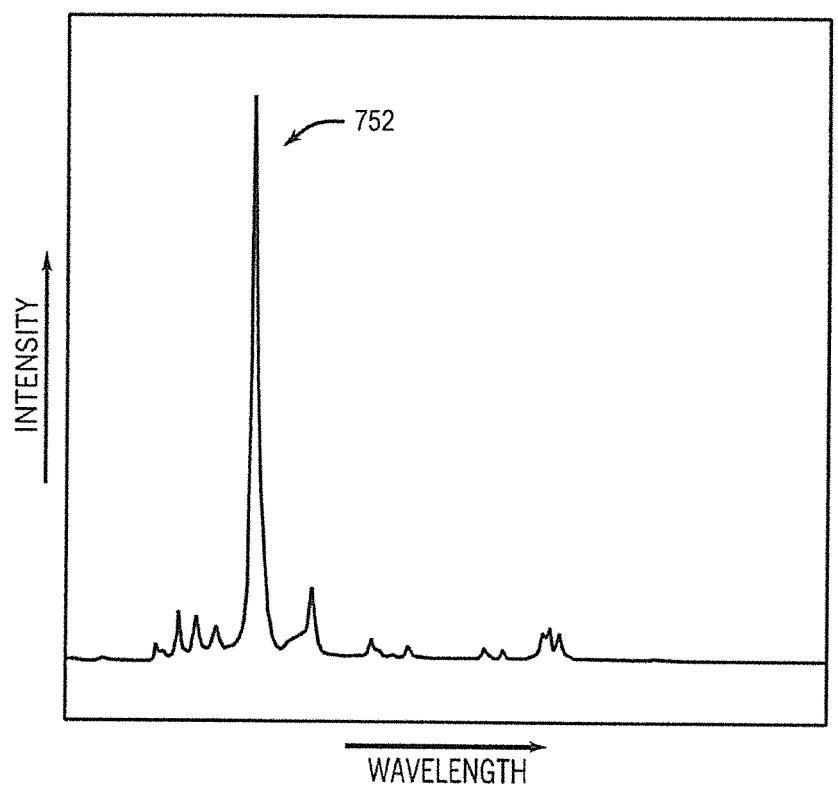
FIG. 7B is an illustration of a phosphor reference spectrum, according to an example of the present disclosure.

In addition or in lieu of the Raman reference, the reference spectrum element may be an absolute wavelength reference, in accordance with further examples. In this regard, the reference spectrum element may contain a phosphorous element. As examples, the reference element may contain one or more of the following compounds: a phosphor, such as Eu doped $Y_2O_3$ (see spectra 752 of FIG. 7B); BPE, Rhodamine 6G; and an upconversion phosphor, such as ytterbium and erbium doped in yttrium oxysulfide ($Y_2O_2S:Yb^{3+},Er^{3+}$) phosphors. Other compounds may be used, in accordance with further implementations.

Figure 8:
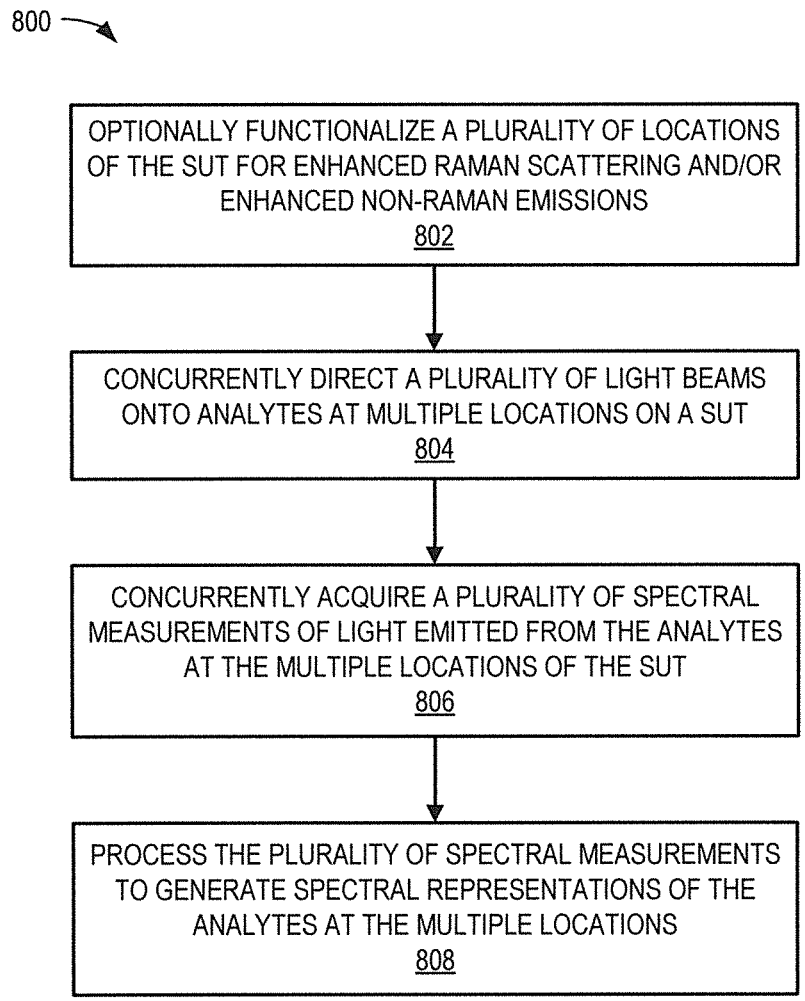
FIG. 8 is a flow diagram of a method for performing spectral analysis on a sample under test, according to an example of the present disclosure.

Turning now to FIG. 8, there is shown a flow diagram of a method 800 for performing spectral analysis on a sample under test, according to an example. It should be understood that the method 800 depicted in FIG. 8 may include additional processes and that some of the processes described herein may be removed and/or modified without departing from a scope of the method 800.

At block 802, a plurality of locations 152 of the SUT 150 may optionally be functionalized for enhanced Raman scattering and/or enhanced non-Raman emissions. The operation at block 802 is considered optional because the method 800 may be implemented without the functionalization of the multiple locations 152 of the SUT 150. In instances in which the multiple locations 152 are functionalized, the multiple locations 152 may be functionalized in a variety of manners as discussed above. As also discussed above, one of the locations 152 may be functionalized to enhance Raman scattering and another one of the locations 152 may be functionalized to enhance non-Raman emissions, e.g., fluorescence, luminescence, etc. In addition, one of the locations 152 may be functionalized to enhance the Raman or non-Raman emission of a specific analyte. Moreover, multiple ones of the locations 152 may be functionalized to enhance the Raman or non-Raman emission of multiple types of respective analytes.

At block 804, a plurality of light beams 104a-104n may concurrently be directed onto analytes at multiple locations 152 on the SUT 150. As discussed above, the plurality of light beams 104a-104n may illuminate the analytes at the multiple locations 152, and the analytes may scatter light in a Raman spectra and/or may emit light in a non-Raman spectra. As also discussed above, the plurality of light beams 104a-104n may originate from a plurality of illumination sources 102a-102n or from a single illumination source 102a. In examples in which the light beams 104a-104n originate from a single illumination source 102, an optical system 110 may split the light beam 102a into multiple beams prior to directing the light beams onto the analytes at the multiple locations 152. In addition, in various examples, the optical system 110 may include telecentric relay optics 160 to further enhance spectral analysis performance.

At block 806, a plurality of spectral measurements of the light scattered and/or emitted 140a-140n from the analytes at the multiple locations 152 of the SUT 150 may concurrently be acquired, for instance, by the sensor array 132 of the spectrometer 130. As discussed above, the sensing array 132 may include, for example, a CMOS/CCD sensor array that contains multiple sensors to simultaneously capture multiple images of the light 140a-140n from the analytes.

At block 808, the plurality of spectral measurements may be processed to generate spectral representations of the analytes at the multiple locations 152 of the SUT 150, in which each of the generated spectral measurements may include at least one of the Raman spectra and the non-Raman spectra. According to an example, a controller 134 of the spectrometer 130 may be formed at least in part by a processor 136 (e.g., a microprocessor, a microcontroller, a processing core, etc.). The processor 136 may generate the spectral representations of the analytes at the multiple locations 152. The processor 136 may also process data representing the composite spectra measurements to perform various operations disclosed herein. For example, the processor 136 may process the multiple spectral data at the multiple locations 152, select the analyte specific spectral signature, and compose an image of the distribution of the analyte. For these purposes, the processor 136 may execute machine readable instructions that are stored on a non-transitory storage media 138, such as a semiconductor memory, magnetic storage, removable media, optical media, and so forth.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus for performing multiple concurrent spectral analyses on a sample under test, said apparatus comprising:
   an optical system to concurrently direct a plurality of light beams onto analytes at multiple locations on the sample under test, wherein the plurality of light beams cause light in either or both of a Raman spectra and a non-Raman spectra to be emitted from the analytes at the multiple locations of the sample under test; and
   a detector to concurrently acquire a plurality of spectral measurements of the light emitted from the analytes at the multiple locations of the sample under test,
   wherein a first location of the multiple locations on the sample under test is functionalized for detecting a particular analyte and a second location of the multiple locations on the sample under test is functionalized for detecting an analyte that differs from the particular analyte.

2. The apparatus according to claim 1, further comprising:
   a processor to process the plurality of spectral measurements to generate spectral representations of the analytes at the multiple locations of the sample under test, wherein each of the generated spectral measurements includes at least one of the Raman spectra and the non-Raman spectra.

3. The apparatus according to claim 1, wherein the first location of the multiple locations on the sample under test is functionalized for enhanced Raman scattering of the particular analyte and the second location of the multiple locations on the sample under test is functionalized for non-Raman signal emission of the analyte that differs from the particular analyte.

4. The apparatus according to claim 1, further comprising:
   a plurality of illumination sources to concurrently emit respective light beams into the optical system.

5. The apparatus according to claim 4, wherein the plurality of illumination sources are to emit the respective light beams at different wavelengths with respect to each other.

6. The apparatus according to claim 1, further comprising:
   an illumination source to emit a light beam; and
   wherein the optical system comprises a lens array that is to split the light beam into the plurality of light beams that are directed onto the multiple locations on the sample under test.

7. The apparatus according to claim 1, wherein the optical system further comprises an optical element that is to communicate the plurality of light beams from an illumination source to the sample under test and to communicate the light emitted from the multiple locations of the sample under test to the detector.

8. The apparatus according to claim 1, wherein the optical system comprises telecentric relay optics that are to limit emission angles of the plurality of light beams directed onto the multiple locations of the sample under test, wherein the telecentric relay optics comprise a single aperture apparatus through which the plurality of light beams are directed.

9. The apparatus according to claim 1, wherein the optical system comprises telecentric relay optics that are to limit emission angles of the light emitted from the multiple locations of the sample under test and directed onto the detector, wherein the telecentric relay optics comprise a single aperture apparatus through which the light emitted from the multiple locations of the sample under test is directed.

10. The apparatus according to claim 1, wherein the detector comprises a sensor array that is to concurrently receive and detect light in either or both of the Raman spectra and the non-Raman spectra emitted from the analytes at the multiple locations of the sample under test.

11. A method for performing spectral analysis on a sample under test, said method comprising:
    functionalizing a first location of multiple locations for enhanced Raman scattering of a particular analyte and functionalizing a second location of the multiple locations for enhanced Raman signal emission of an analyte that is different from the particular analyte;
    concurrently directing a plurality of light beams onto analytes at the multiple locations on the sample under test, wherein the plurality of light beams cause light in either or both of a Raman spectra and a non-Raman spectra to be emitted from the analytes at the multiple locations of the sample under test;
    concurrently acquiring a plurality of spectral measurements of the light emitted from the analytes at the multiple locations of the sample under test; and
    processing the plurality of spectral measurements to generate spectral representations of the analytes at the multiple locations of the sample under test, wherein each of the generated spectral measurements includes at least one of the Raman spectra and the non-Raman spectra.

12. The method according to claim 11, wherein functionalizing the first location and functionalizing the second location further comprises functionalizing the first location differently from the second location.

13. The method according to claim 11, wherein concurrently directing the plurality of light beams onto analytes at the multiple locations on the sample under test further comprises concurrently directing the plurality light beams from a plurality of illumination sources, wherein the plurality of light beams have different wavelengths with respect to each other.

14. The method according to claim 11, wherein concurrently directing the plurality of light beams onto analytes at the multiple locations on the sample under test further comprises directing a single source light beam into an optical system that separates the single source light beam into the plurality of light beams prior to being directed onto the analytes at the multiple locations on the sample under test.

* * * * *